(12) United States Patent
Matsunaga et al.

(10) Patent No.: US 9,126,277 B2
(45) Date of Patent: Sep. 8, 2015

(54) POWER SUPPLY DEVICE FOR WIRE ELECTRIC DISCHARGE MACHINE CAPABLE OF SUPPRESSING WIRE ELECTRODE CONSUMPTION

(75) Inventors: Tomoaki Matsunaga, Yamanashi (JP); Akiyoshi Kawahara, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 13/477,162

(22) Filed: May 22, 2012

(65) Prior Publication Data

US 2013/0015162 A1 Jan. 17, 2013

(30) Foreign Application Priority Data

Jul. 14, 2011 (JP) .................. 2011-155502

(51) Int. Cl.
*B23K 9/00* (2006.01)
*B23K 9/09* (2006.01)
*B23H 7/04* (2006.01)
*B23H 1/02* (2006.01)

(52) U.S. Cl.
CPC .................. *B23H 7/04* (2013.01); *B23H 1/022* (2013.01); *B23H 2300/20* (2013.01)

(58) Field of Classification Search
CPC ...... B23H 1/022; B23H 2300/20; B23H 7/04; B23K 9/00; B23K 9/09; B23K 9/091
USPC .................. 219/69.11, 69.18, 137 PS, 130.1
See application file for complete search history.

(56) References Cited

U.S. PATENT DOCUMENTS

| | | | | |
|---|---|---|---|---|
| 5,083,001 A | * | 1/1992 | Kinbara et al. | ............ 219/69.18 |
| 6,130,510 A | * | 10/2000 | Kurihara et al. | ............... 315/225 |
| 6,512,200 B2 | * | 1/2003 | Norrish et al. | .......... 219/137 PS |
| 6,660,957 B1 | | 12/2003 | Ohguro et al. | |
| 2010/0033692 A1 | * | 2/2010 | Watanabe et al. | ............... 353/85 |

FOREIGN PATENT DOCUMENTS

| | | |
|---|---|---|
| JP | 64-11713 A | 1/1989 |
| JP | 7-68417 A | 3/1995 |

(Continued)

OTHER PUBLICATIONS

JP Office Action, dated Aug. 21, 2012, issued in JP Application No. 2011-155502.

(Continued)

*Primary Examiner* — Tu B Hoang
*Assistant Examiner* — Michael Hoang
(74) *Attorney, Agent, or Firm* — Lowe Hauptman & Ham, LLP

(57) ABSTRACT

A power supply device for a wire electric discharge machine is provided with a main DC power source and an auxiliary DC power source with variable voltage. While first pulses are being output, a voltage from the main DC power source is applied to a machining gap between a wire electrode and a workpiece. While second pulses are being output with the output of the first pulses stopped, inductive energy stored by an inductance in a circuit is passed through the gap, and a voltage corresponding to a peak current value provided by the main DC power source is applied to the gap by the auxiliary DC power source. When the output of the second pulses is stopped, the inductive energy is returned to the main DC power source.

11 Claims, 4 Drawing Sheets

(56) References Cited

FOREIGN PATENT DOCUMENTS

| JP | 11048039 A | 2/1999 |
| JP | 2007-196340 A | 8/2007 |

OTHER PUBLICATIONS

Extended European Search Report dated Oct. 14, 2013, corresponds to European patent application No. 12162244.3.

* cited by examiner (a)

(b)

sv: VOLTAGE OF AUXILIARY DC POWER SOURCE
av: ARC VOLTAGE

| t1 | sv | REDUCTION IN CONSUMPTION (%) |
|---|---|---|
| t | 0 | - |
| 0.75 × t | av | 5 |
| 0.5 × t | 2 × av | 8 | t: 0.8 μs $$sv = \frac{1 - t_1/t}{0.25} av$$

\* REDUCTION IN CONSUMPTION COMPARED WITH CASE OF t1 = t, sv = 0

| t1 | t2 | REDUCTION IN CONSUMPTION (%) |
|---|---|---|
| t1' | t2' | - |
| 0.9 × t1' | 1.89 × t2' | 5 |
| 0.86 × t1' | 2.27 × t2' | 7 |
| 0.82 × t1' | 2.65 × t2' | 10 | t1' : 0.8 μs
t2' : 0.6 μs $t1 = a \times t1'$    $t2 = b \times t2'$ $$b = \frac{t1' + t2' - a^2 t1'}{a t2'} + 5(1 - t1/t1')$$

\* REDUCTION IN CONSUMPTION COMPARED WITH CASE OF t1 = t1', t2 = t2'

POWER SUPPLY DEVICE FOR WIRE ELECTRIC DISCHARGE MACHINE CAPABLE OF SUPPRESSING WIRE ELECTRODE CONSUMPTION

RELATED APPLICATIONS

The present application is based on, and claims priority from, Japanese Application Number 2011-155502, filed Jul. 14, 2011, the disclosure of which is hereby incorporated by reference herein in its entirety.

BACKGROUND OF THE INVENTION

1. Field of the Invention

The present invention relates to a power supply device for a wire electric discharge machine capable of suppressing wire electrode consumption.

2. Description of the Related Art

According to a power supply device for a conventional electric discharge machine, machining current is maintained based on a current (electric energy) stored in an inductor the moment a switching element is turned off after the power supply voltage is applied between an electrode and a workpiece when electric discharge is caused. The current stored in the inductor does not have a constant value because of resistance components and arc voltage and is reduced with time. Thereafter, switching is performed to regenerate the current in the inductor to the power supply, thereby quickly stopping current flow to the workpiece.

A technique disclosed in Japanese Patent Application Laid-Open No. 11-48039 uses two dc power sources, a high-voltage main DC power source and a low-voltage auxiliary DC power source. Power supply voltages from these two dc power sources are applied simultaneously, and discharge current is rapidly started by the main DC power source immediately after the start of electric discharge. Thereafter, the voltage application from the main DC power source is stopped, and the discharge current is kept constant based on current from the auxiliary DC power source.

In an electric discharge apparatus, the peak value of electric discharge machining current is proportional to the period of voltage application. High energy should be input to increase the machining speed. The higher the peak, the higher the machining speed is. If the peak is higher, however, then wire electrode consumption will be greater.

According to the prior art technique, the wire electrode consumption and load on a filter are so heavy that the filter life is short. Thus, the filter must be replaced so frequently that the running cost increases. If the peak of pulses of the electric discharge machining current is lowered, the machining speed is inevitably reduced, although the wire electrode consumption can be suppressed.

SUMMARY OF THE INVENTION

Accordingly, the object of the present invention is to provide an electric discharge power supply device for an electric discharge machine, capable of suppressing wire electrode consumption and preventing reduction in machining speed by reducing peak current.

An electric discharge power supply device for an electric discharge machine according to a first aspect of the present invention comprises a main DC power source, an auxiliary DC power source with variable voltage, a first circuit configured to output first pulses having a first predetermined width at predetermined time intervals, stop the output of the first pulses, and then output second pulses having a second predetermined width at predetermined time intervals, a second circuit configured to apply a voltage from the main DC power source to an inter-electrode gap between a wire electrode and a workpiece while the first pulses are being output from the first circuit, a third circuit configured to pass a current, which is generated by inductive energy stored by an inductance in the second circuit, between the wire electrode and the workpiece while the second pulses are being output and cause the auxiliary DC power source to apply a voltage corresponding to a peak current value provided by the main DC power source, and a fourth circuit configured to return the current generated by the inductive energy stored by the inductance in the second circuit to the main DC power source when the output of the second pulses is stopped.

The lower the peak current value provided by the main DC power source, the higher the voltage applied from the auxiliary DC power source can be.

An electric discharge power supply device for an electric discharge machine according to a second aspect of the present invention comprises a main DC power source, an auxiliary DC power source with variable voltage, a first circuit configured to output first pulses having a first predetermined width at predetermined time intervals, stop the output of the first pulses, and then output second pulses having a second predetermined width at predetermined time intervals, a second circuit configured to apply a voltage from the main DC power source to a gap between a wire electrode and a workpiece while the first pulses are being output from the first circuit, a third circuit configured to output the second pulses for a period of time corresponding to a peak current value provided by the main DC power source, pass a current, which is generated by inductive energy stored by an inductance in the second circuit, between the wire electrode and the workpiece while the second pulses are being output, and cause the auxiliary DC power source to apply a voltage, and a fourth circuit configured to return the current generated by the inductive energy stored by the inductance in the second circuit to the main DC power source when the output of the second pulses is stopped.

The lower the peak current value provided by the main DC power source, the longer the period of application of the voltage from the auxiliary DC power source can be.

According to the present invention, there may be provided an electric discharge power supply device for an electric discharge machine, capable of suppressing wire electrode consumption and preventing reduction in machining speed by reducing peak current.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

Figure 1:
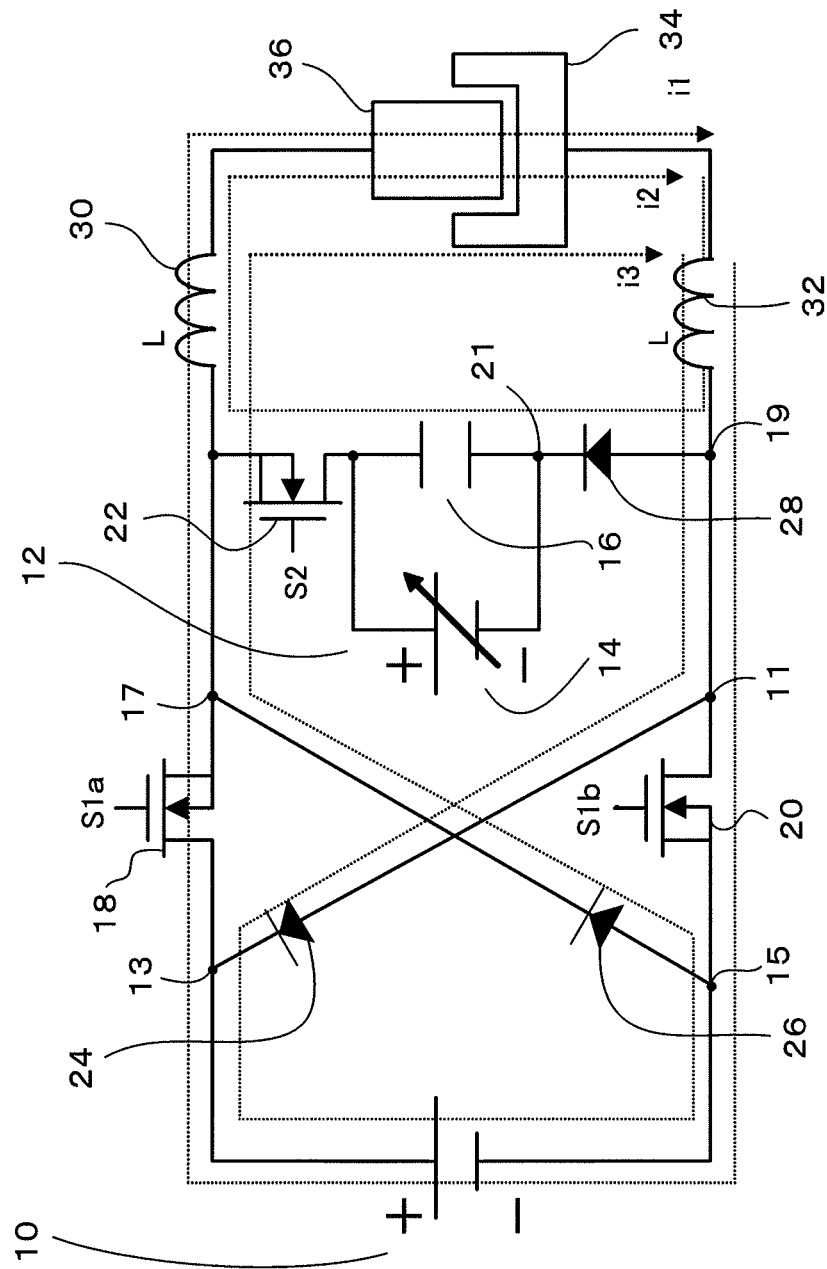
FIG. 1 is a diagram illustrating the principal part of one embodiment of a power supply device for an electric discharge machine according to the present invention.
Figure 2:
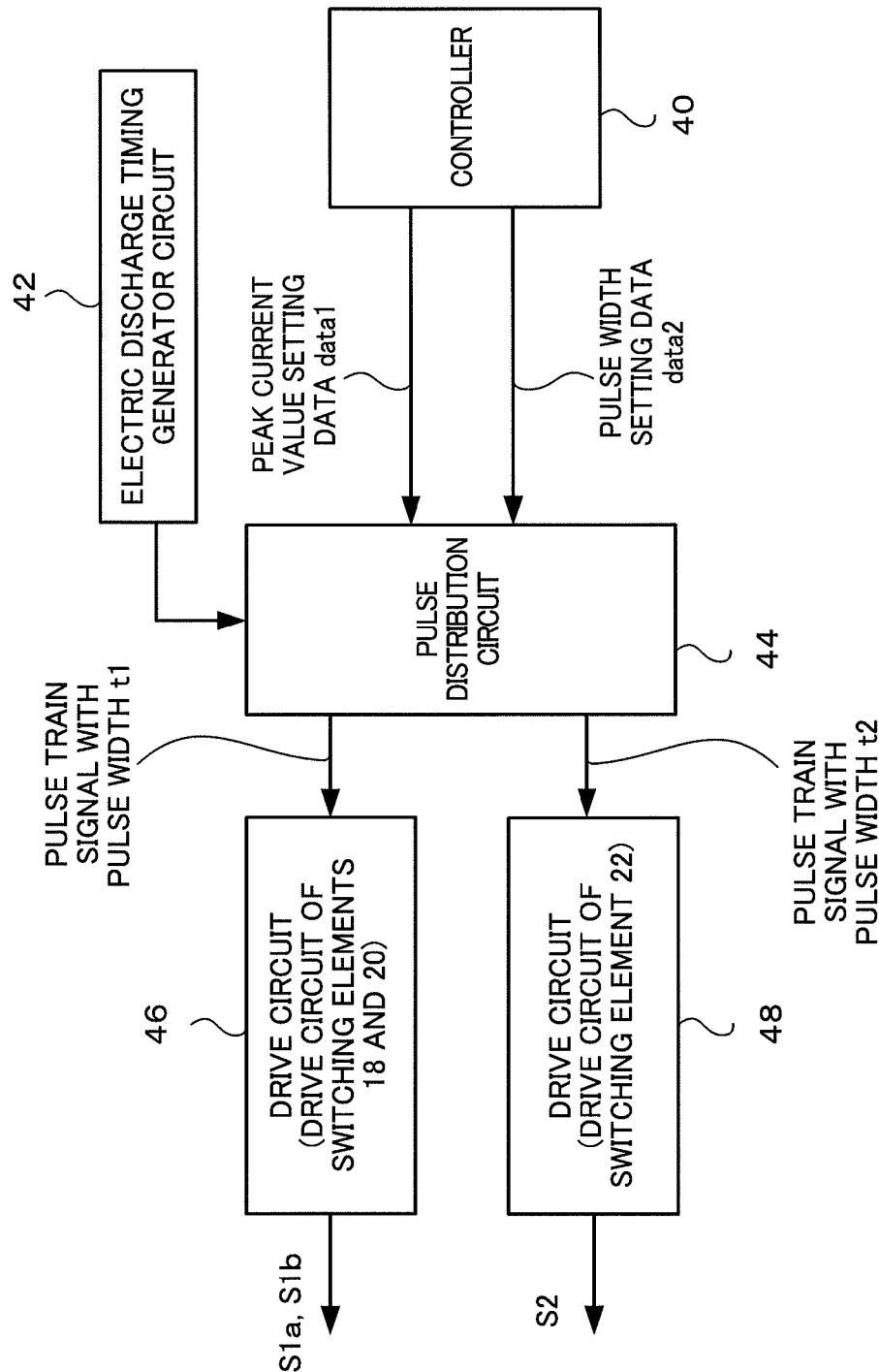
FIG. 2 is a diagram illustrating a control unit in the power supply device for the electric discharge machine of FIG. 1.

FIG. 1 is a diagram illustrating the principal part of one embodiment of a power supply device for an electric discharge machine according to the present invention. FIG. 2 is a diagram illustrating a control unit in the power supply device for the electric discharge machine of FIG. 1.

An auxiliary DC power source 12, whose voltage is variable and lower than the output voltage of a main DC power source 10, comprises a variable DC voltage source 14 and a capacitor 16. Numerals 18, 20 and 22 denote switching elements formed of transistors or FETs. In the example shown in FIG. 1, these switching elements 18, 20 and 22 are FETs.

The positive terminal of the main DC power source 10 is connected to a workpiece 36 through a first switching element 18 and a first inductor 30. The negative terminal of the main DC power source 10 is connected to a wire electrode 34 through a second switching element 20 and a second inductor 32. The positive terminal of the auxiliary DC power source 12 is connected to the workpiece 36 through a third switching element 22 and the first inductor 30. The negative terminal of the auxiliary DC power source 12 is connected to the wire electrode 34 through a diode 28 and the second inductor 32. The first and second inductors 30 and 32 include stray inductances that are produced by wiring or the like and can store inductive energy.

One terminal of a first diode 24 is connected to a junction 13 between the positive terminal of the main DC power source 10 and the first switching element 18. The other terminal of the first diode 24 is connected to a junction 11 between the second switching element 20 and the second inductor 32. The first diode 24 is connected between the junctions 11 and 13 so that the direction from the junction 11 to the junction 13 is the forward direction.

One terminal of a second diode 26 is connected to a junction 15 between the negative terminal of the main DC power source 10 and the second switching element 20. The other terminal of the second diode 26 is connected to a junction 17 between the first switching element 18 and the first inductor 30. The second diode 26 is connected between the junctions 15 and 17 so that the direction from the junction 15 to the junction 17 is the forward direction.

One terminal of the third diode 28 is connected to a junction 19 between the second switching element 20 and the second inductor 32. The other terminal of the third diode 28 is connected to a junction 21 of the negative terminal of the auxiliary DC power source 12. The third diode 28 is connected between the junctions 19 and 21 so that the direction from the junction 19 to the junction 21 is the forward direction.

Outputs S1$a$ and S1$b$ of a first drive circuit 46 (see FIG. 2) are connected to the gates of the first and second switching elements 18 and 20, respectively. Further, an output S2 of a second drive circuit 48 (see FIG. 2) is connected to the gate of the third switching element 22. The first and second drive circuits 46 and 48 turn on and off the switching elements 18, 20 and the switching element 22, respectively, in response to pulses output from a pulse distribution circuit 44. The outputs S1$a$ and S1$b$ for controlling the first and second switching elements 18 and 20, respectively, are signals of the same waveform.

The pulse distribution circuit 44 is formed of a monostable multivibrator or the like, which delivers pulses having pulse widths t1 and t2, predetermined based on peak current value setting data (data1) and pulse width setting data (data2) output from a controller 40 for controlling the entire electric discharge machine, to the first and second drive circuits 46 and 48, in response to a timing signal output from an electric discharge timing generator circuit 42 when an electric discharge occurs. The first drive circuit 46 delivers the pulse outputs S1$a$ and S1$b$ having the pulse width t1 to the gates of the first and second switching elements 18 and 20, respectively, thereby turning on and off the switching elements 18 and 20. On the other hand, the second drive circuit 48 delivers the pulse output S2 having the pulse width t2 to the gate of the third switching element 22, thereby turning on and off the switching element 22. The pulse distribution circuit 44, which outputs the pulses having the predetermined two different pulse widths t1 and t2 to the first and second drive circuits 46 and 48, respectively, as shown in FIG. 2, is also referred to as a first circuit.

The size of a peak current value varies depending on the magnitude of the applied voltage of the main DC power source 10, as well as on the application period of voltage (gap voltage) applied from the power source 10 applied between the wire electrode 34 and the workpiece 36. The size of the voltage of the main DC power source shown in FIG. 1 is assumed to be set separately. Data (t1) that defines the pulse width for turning on the switching elements 18 and 20, in order to apply voltage from the main DC power source 10 to a machining gap, is delivered as the peak current value setting data data1 from the controller 40 to the pulse distribution circuit 44 of FIG. 2. In addition, data (t2) that defines the pulse width for turning on the switching element 22, in order to apply voltage from the auxiliary DC power source 12 to the machining gap, is delivered as the pulse width setting data data2 from the controller 40 to the pulse distribution circuit 44 of FIG. 2.

The following is a description of three states of discharge current that flows through the gap between the wire electrode 34 and the workpiece 36 as the first, second and third switching elements 18, 20 and 20 are turned on and off.

The first and second switching elements 18 and 20 are turned on by activating the outputs S1$a$ and S1$b$ from the first drive circuit 46, and voltage from the main DC power source 10 is applied between the workpiece 36 and the wire electrode 34 such that discharge current (current i1 of FIG. 1) is passed suddenly.

Thereafter, the outputs S1a and S1b from the first drive circuit 46 are turned off so that the first and second switching elements 18 and 20 are turned off, whereupon the voltage application from the main DC power source 10 is stopped. At the same time, the output S2 from the second drive circuit 48 is turned on so that the third switching element 22 is turned on, whereby voltage from the auxiliary DC power source 12 is applied between the workpiece 36 and the wire electrode 34. When the voltage application from the main DC power source 10 is stopped, the discharge current (current i2 of FIG. 1) that flows between the wire electrode 34 and the workpiece 36 is kept constant or gradually increased by current derived from inductive energy stored in the inductors 30 and 32 in the circuit and transient build-up current from the auxiliary DC power source 12. The influence of a stray inductance of the auxiliary DC power source 12 is reduced to easily increase current by connecting the capacitor 16 in parallel with the auxiliary DC power source 12.

Thereafter, the output S2 from the second drive circuit 48 is turned off so that the switching element 22 is turned off. Thereupon, current (current i3 of FIG. 1) generated by inductive energy remaining in the circuit is regenerated to the main DC power source 10, and the electric discharge is stopped suddenly.

Paths through which the currents i1, i2 and i3 flow are also referred to as second, third, and fourth circuits, respectively.

Figure 3:
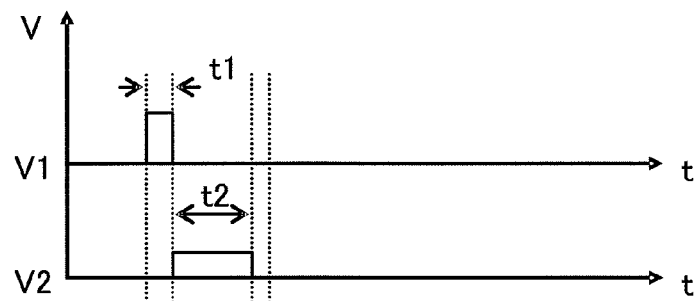
FIG. 3 is a diagram illustrating timings of voltage application from main and auxiliary DC power sources after the occurrence of electric discharge and current flowing through a gap (machining gap) between a workpiece and a wire electrode.
Figure 3:
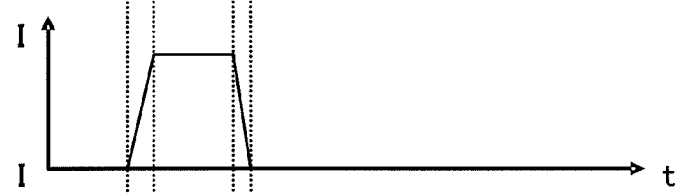

FIG. 3 shows timings of voltage application after the occurrence of electric discharge and current flowing through the gap (machining gap) between the wire electrode and the workpiece.

The voltage having the width t1 shown in (a) of FIG. 3 is a voltage that is applied from the main DC power source 10 with the first and second switching elements 18 and 20 turned on and the third switching element 22 turned off. Further, the voltage having the width t2 is a voltage that is applied from the auxiliary DC power source 12 with the first and second switching elements 18 and 20 turned off and the third switching element 22 turned on. Reference symbols 't1' and 't2' denote periods of voltage application from the main and auxiliary DC power sources 10 and 12, respectively. The longer the period 't1', the higher the peak of electric discharge machining current (see (b) of FIG. 3) and machining speed during the period 't1' are. The shorter the time elapsed since the occurrence of electric discharge for electric discharge machining, however, the greater the impact on the wire electrode 34 is, so that the more the wire is consumed. The period 't2' determines the gradient at which the electric discharge machining current is reduced depending on the voltage value of the auxiliary DC power source 12.

Figure 4:
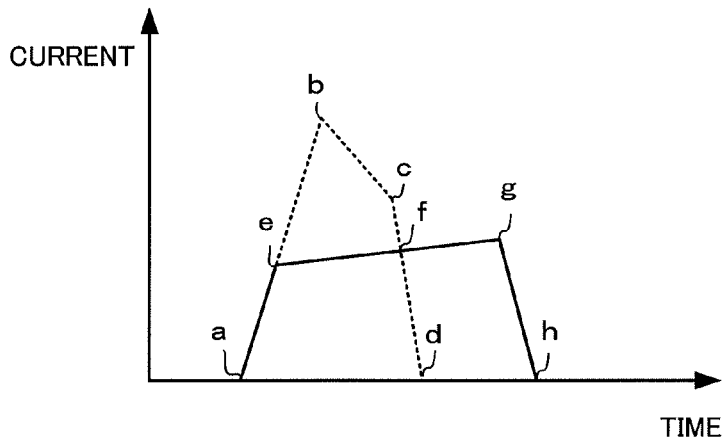
FIG. 4 is a diagram illustrating waveforms of electric discharge machining currents according to the present embodiment and the prior art.

The electric discharge machining current is gradually increased during the period 't2' by increasing the voltage value of the auxiliary DC power source 12. By doing this, as shown in FIG. 4, the same amount of energy as in a high-peak current mode can be input even if the first period 't1' is shortened to lower the peak. Since the arc voltage varies depending on the materials of the workpiece 36 and the wire electrode 34, the value of the voltage to be applied from the auxiliary DC power source 12 should be adjusted to the materials. In FIG. 4, a broken line represents a machining-gap current generated by the prior art technique, while a full line represents a machining-gap current generated by the power supply device of the present invention.

Figure 5:
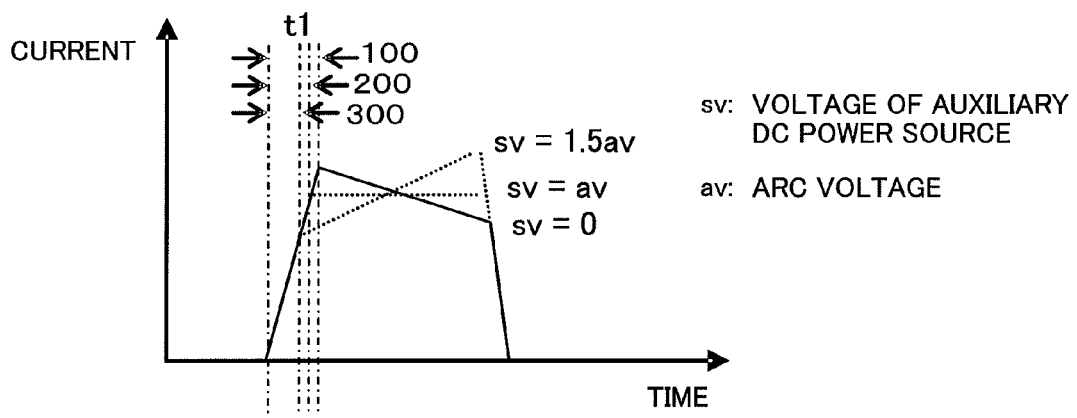
FIG. 5 is a diagram illustrating waveforms of the current flowing through the gap (machining gap) between the workpiece and the wire electrode in the electric discharge machining power supply device of the invention.
Figures 6, 7, 8:
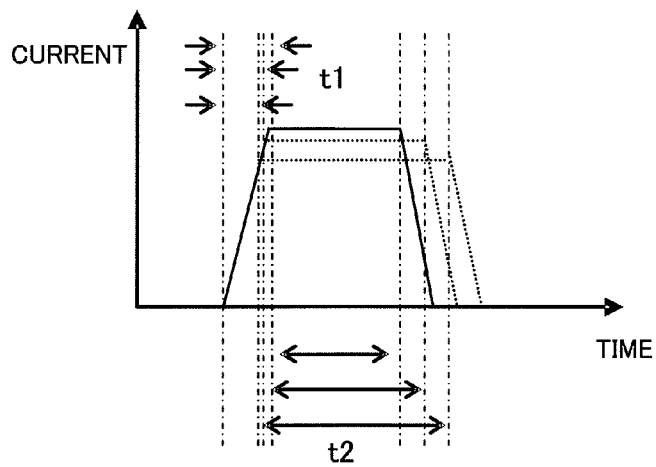
FIG. 6 is a diagram illustrating an example in which the voltage value of the auxiliary DC power source is increased by an increment equal to the arc voltage for each 25% reduction in the peak of current from the main DC power source.
FIG. 7 is a diagram illustrating waveforms of the current flowing through the gap (machining gap) between the workpiece and the wire electrode in the electric discharge machining power supply device of the invention.
FIG. 8 is a diagram illustrating an example in which the sum of the application period of the auxiliary DC power source, as an area value of a current equal to that before the reduction in the peak of the current from the main DC power source, and a coefficient corresponding to the peak is set as the period of voltage application from the auxiliary DC power source.

As shown in FIGS. 5 and 6, the value of the period 't1' of voltage application from the main DC power source 10 is reduced so that the peak of the electric discharge machining current from the power source 10 is lowered and the voltage value of the auxiliary DC power source 12 is increased. By doing this, the inclination of the machining-gap current based on the period 't2' of voltage application from the auxiliary DC power source 12 can be increased so that electric discharge machining current pulses that suppress consumption of the wire electrode 34 can be generated without reducing the machining speed. In FIG. 5, the value of the period 't1' is reduced (that is, the period 't1' becomes shorter) as numeral 100 is replaced by numeral 300. If the period 't1' is made extremely short, an appropriate machining speed cannot be obtained despite an increase in inclination during the period 't2'. The period of voltage application from the main DC power source 10 and its corresponding voltage value of the auxiliary DC power source 12 can be stored in a data table such that pulses that cause less consumption of the wire can be generated with reference to the table. As shown in FIG. 6, the voltage value of the auxiliary DC power source 12 is increased by an increment equal to the arc voltage for each 25% reduction in the peak of the current from the main DC power source 10.

As shown in FIGS. 7 and 8, moreover, the periods 't1' and 't2' of voltage application from the main and auxiliary DC power sources 10 and 12 are reduced and increased, respectively, when the voltage value of the auxiliary DC power source 12 is made equal to the arc voltage so that the electric discharge machining current is kept constant. By doing this, electric discharge machining current pulses that can suppress consumption of the wire electrode can be generated without reducing the machining speed. If the period 't2' is then made extremely short, the wire electrode 34 adheres to the workpiece 36. The period of voltage application from the main DC power source 10 and its corresponding application period of the auxiliary DC power source 12 are stored in the data table, whereby the pulses that cause less consumption of the wire can be generated with reference to the table. In FIG. 8, the sum of the application period of the auxiliary DC power source 12, as an area value of a current equal to that before the reduction in the peak of the current from the main DC power source 10, and a coefficient corresponding to the peak is set as the period of voltage application from the auxiliary DC power source 12.

FIG. 6 is a table showing the amount of consumption of a brass wire of 0.25-mm diameter used to machine a workpiece of SKD11, based on the voltage value of the auxiliary DC power source 12 with the equivalent machining speed for the period 't1'. FIG. 8 is a table showing the amount of consumption of a brass wire of 0.25-mm diameter used to machine a workpiece of SKD11, based on the length t2 with the equivalent machining speed for the period 't1'.

If the voltage value of the auxiliary DC power source 12 is made variable, as described above, it can be changed to an appropriate value according to the materials of the workpiece 36 and the wire electrode 34 and the application period of the main DC power source 10. Since the pulses that cause less consumption of the wire electrode 34 are generated, the filter life is extended, so that costs can be reduced.

In the wire electric discharge machine, the wire electrode is highly consumed if a high current is passed immediately after the occurrence of electric discharge. If a high current is passed with a lag behind the occurrence of electric discharge, the consumption of the wire electrode can be suppressed without changing the amount of input energy. As the electric discharge period becomes longer, in the conventional wire electric discharge machine, the value of the electric discharge machining current is gradually reduced or kept constant, as indicated by the broken line in FIG. 4. It is necessary, therefore, to pass a high current when electric discharge is caused. Thus, the present invention has an effect that not less energy than usual can be input even with a low current during electric discharge by gradually increasing the electric discharge machining current, as indicated by the full line in FIG. 4.

In order to gradually increase the electric discharge machining current, moreover, it is necessary to set the voltage value of the auxiliary DC power source to a level not lower than the arc voltage produced in the machining gap between the workpiece and the wire electrode. If the materials of the workpiece and the wire electrode change, however, the arc voltage also changes. Therefore, only a single set of materials can be dealt with if the voltage of the auxiliary DC power source is not variable. Thus, in the power supply device for the electric discharge machine comprising the main and auxiliary DC power sources, a plurality of sets of materials can be dealt with if pulses are generated such that the voltage of the auxiliary DC power source is variable and the voltage value and application period of the auxiliary DC power source are varied when the peak of the current from the main DC power source is small.

The invention claimed is:

1. A power supply device for a wire electric discharge machine, the power supply device comprising:
   a main DC power source;
   an auxiliary DC power source with variable voltage;
   a first circuit configured to output a first pulse, stop the output of the first pulse, and then output a second pulse;
   a second circuit configured to apply a voltage from the main DC power source to a machining gap between a wire electrode and a workpiece while the first pulse is being output from the first circuit, the second circuit comprising an inductance;
   a third circuit configured to, while the second pulse is being output,
      pass a current, which is generated by inductive energy stored by the inductance in the second circuit, between the wire electrode and the workpiece, and
      cause the auxiliary DC power source to apply a voltage, which has a voltage level corresponding to a peak current value provided by the main DC power source at the end of the first pulse, to the machining gap to change the current according to the peak current value at the end of the first pulse; and
   a fourth circuit configured to return the current generated by the inductive energy stored by the inductance in the second circuit to the main DC power source when the output of the second pulse is stopped.

2. The power supply device for a wire electric discharge machine according to claim 1, wherein the lower the peak current value provided by the main DC power source, the higher the voltage applied from the auxiliary DC power source is.

3. The power supply device according to claim 1, wherein the voltage of the auxiliary DC power source is equal to or higher than an arc voltage produced between the workpiece and the wire electrode.

4. The power supply device according to claim 1, wherein the voltage of the auxiliary DC power source is variable according to materials of the workpiece and the wire electrode.

5. The power supply device according to claim 1, wherein, while the second pulse is being output,
   in response to a first value of the peak current value, the voltage of the auxiliary DC power source has a first voltage level configured to cause the current to decrease, and
   in response to a second value of the peak current value, the voltage of the auxiliary DC power source has a second voltage level configured to cause the current to increase.

6. The power supply device according to claim 5, wherein the first value is greater than the second value.

7. The power supply device according to claim 5, wherein the first voltage level is lower than the second voltage level.

8. A power supply device for a wire electric discharge machine, the power supply device comprising:
   a main DC power source;
   an auxiliary DC power source with variable voltage;
   a first circuit configured to output a first pulse, stop the output of the first pulse, and then output a second pulse;
   a second circuit configured to apply a first voltage from the main DC power source to a machining gap between a wire electrode and a workpiece while the first pulse is being output from the first circuit, the second circuit comprising an inductance;
   a third circuit configured to, while the second pulse is being output,
      pass a current, which is generated by inductive energy stored by the inductance in the second circuit, between the wire electrode and the workpiece, and
      cause the auxiliary DC power source to apply a second voltage to the machining gap,
      wherein
      a period of application of the first voltage from the main DC power source and a corresponding period of application of the second voltage from the auxiliary DC power source are pre-stored in a data table,
      the period of application of the second voltage corresponds to a peak current value provided by the main DC power source at the end of the first pulse,
      in response to the peak current value being a first current value, the period of application of the second voltage has a first duration during which the current is maintained at the first current value, and
      in response to the peak current value being a second current value, the period of application of the second voltage has a second duration during which the current is maintained at the second current value, the second current value is greater than the first current value, and the second duration is shorter than the first duration; and
   a fourth circuit configured to return the current generated by the inductive energy stored by the inductance in the second circuit to the main DC power source when the output of the second pulse is stopped.

9. The power supply device for a wire electric discharge machine according to claim 8, wherein the lower the peak current value provided by the main DC power source, the longer the period of application of the voltage from the auxiliary DC power source is.

10. The power supply device according to claim 8, wherein the second voltage of the auxiliary DC power source is equal to or higher than an arc voltage produced between the workpiece and the wire electrode.

11. The power supply device according to claim 8, wherein the second voltage of the auxiliary DC power source is variable according to materials of the workpiece and the wire electrode.

* * * * *